F. X. KUHN.
ICE CREAM BRICK CUTTER.
APPLICATION FILED JUNE 11, 1915.
1,325,726.
Patented Dec. 23, 1919.
2 SHEETS—SHEET 1.
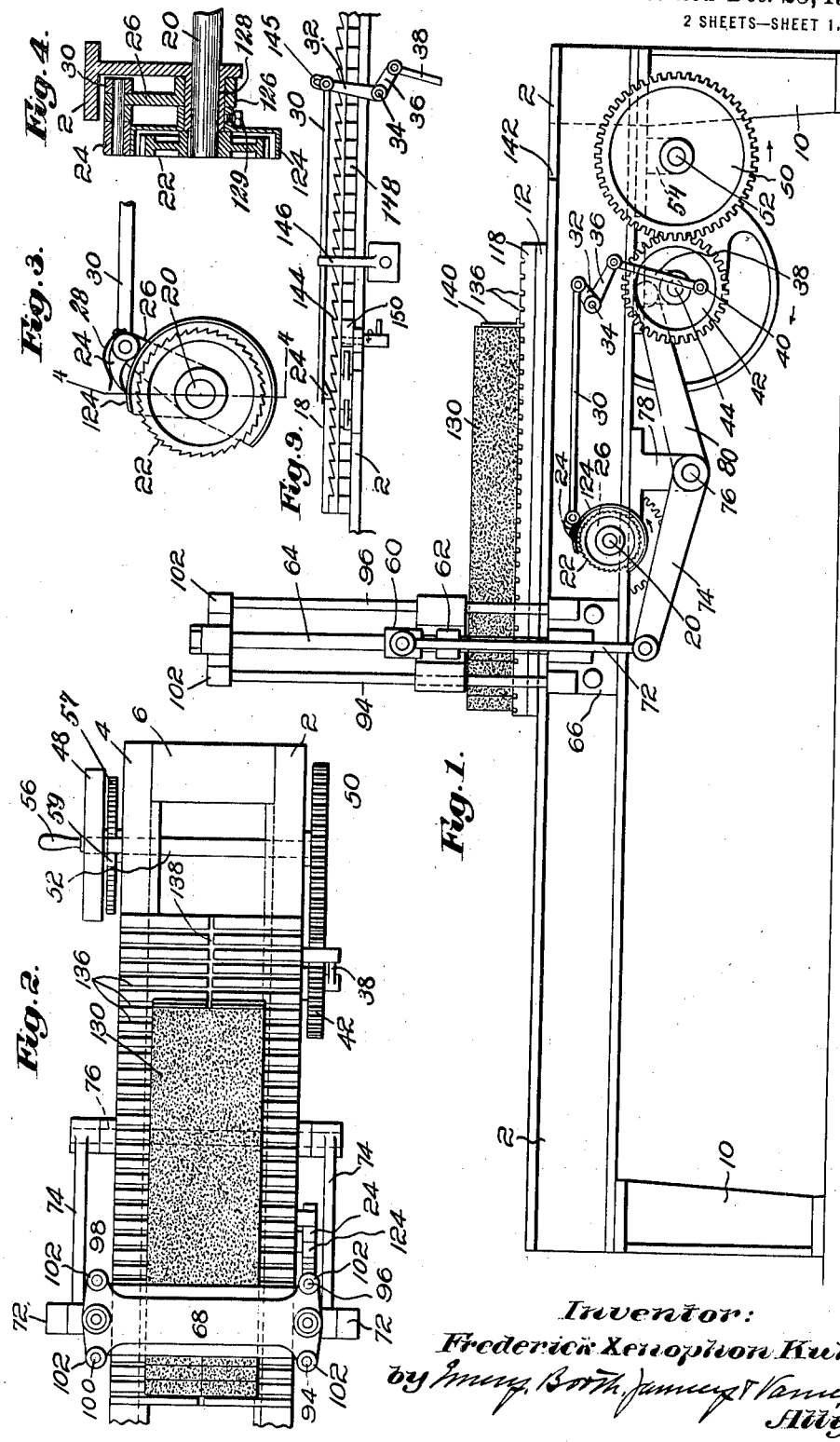
Inventor:
Frederick Xenophon Kuhn
by Emery, Booth, Janney & Varney
Attys.

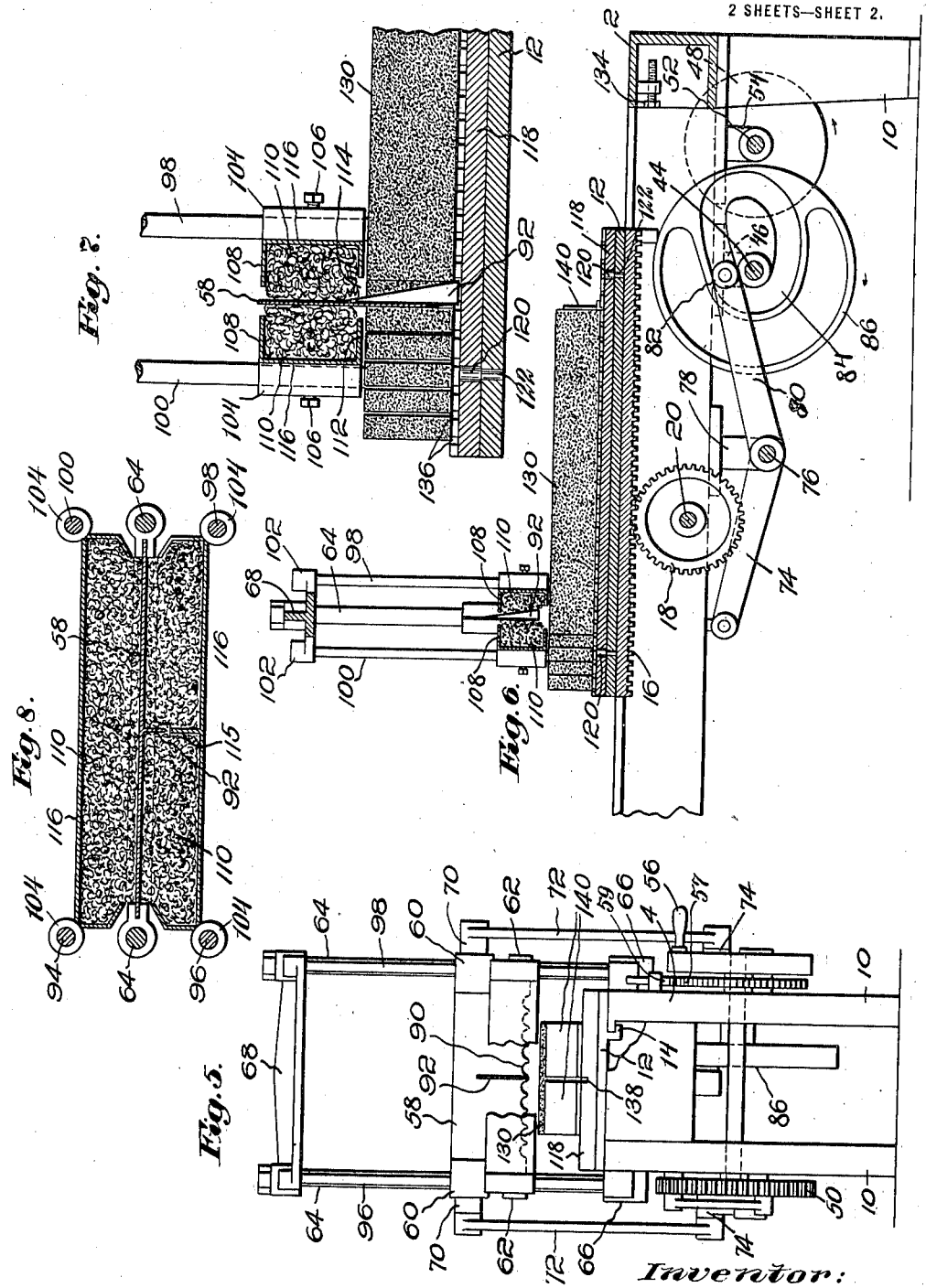

UNITED STATES PATENT OFFICE.

FREDERICK X. KUHN, OF BROOKLINE, MASSACHUSETTS.

ICE-CREAM-BRICK CUTTER.

1,325,726.     Specification of Letters Patent.     Patented Dec. 23, 1919.

Application filed June 11, 1915. Serial No. 33,610.

*To all whom it may concern:*

Be it known that I, FREDERICK XENOPHON KUHN, a citizen of the United States, and a resident of Brookline, county of Norfolk, and Commonwealth of Massachusetts, have invented an Improvement in Ice-Cream-Brick Cutters, of which the following description, in connection with the accompanying drawings, is a specification, like characters on the drawings representing like parts.

This invention relates to cutting or slicing machines, and has for its object more particularly to provide a novel machine for cutting slabs or blocks of plastic or other relatively soft material, such as ice cream or other frozen materials, into smaller portions or bricks.

One of the objects and aims of the invention is to provide a machine of the character referred to which shall be of simple construction, of easy manipulation and efficient and rapid in operation. These and other objects and aims of the invention will be best understood from the following description, taken in connection with the accompanying drawings, of one form or embodiment of the invention shown and described for illustrative purposes, it being understood that the invention in its true scope is definitely set forth by the claims.

In the drawings:

Figure 1 is a side elevation of an ice cream cutting or slicing machine embodying the present invention, with a slab or block of ice cream thereon;

Fig. 2 is a plan view of the right-hand portion of the machine shown in Fig. 1 with the slab or block of ice cream thereon;

Fig. 3 is a detail of the feeding pawl, ratchet and shield of the feeding mechanism for the carriage upon which the block of ice cream is placed;

Fig. 4 is a section on line 4—4 of Fig. 3;

Fig. 5 is an end view of the machine looking from the right side of Fig. 1;

Fig. 6 is a longitudinal sectional elevation of a portion of the machine, certain parts being shown in section;

Fig. 7 is a detail on a somewhat enlarged scale of the knife clearing or cleaning means;

Fig. 8 is a horizontal transverse section of the receptacles shown in Fig. 7, containing the knife cleaning means;

Fig. 9 shows a modified construction of the material feeding mechanism.

In the machine embodying the invention, shown for illustrative purposes, Figs. 1 to 8, the frame of the machine may be of any suitable construction, said frame herein including two longitudinally extending side frame members 2 and 4 joined near their ends by transverse frame members 6, one of which is shown in Fig. 2 and provided with feet 10. If desired, the feet may be fastened to the floor or other supporting surface of the machine in any suitable manner.

A carriage 12 rests upon the upper surfaces of the two longitudinal frame members 2 and 4 and is provided upon its under side with downwardly projecting ribs 14 which extend along the inner edges of the side frame members 2 and 4 parallel to the latter, said carriage being thus adapted to slide longitudinally of the frame of the machine but being secured against lateral displacement thereon by engagement of the ribs 14—14 with the inner edges of said side frame members 2 and 4.

The invention contemplates means for feeding the carriage 12 longitudinally of the frame, said means, in the illustrative embodiment of the invention therein shown, comprising a rack 16 provided upon the under side of the carriage and preferably centrally thereof. A pinion 18 engages said rack, said pinion being keyed or otherwise rigidly secured to a transverse shaft 20 journaled in bearings in the side frame members 2 and 4. Said shaft extends through the side frame member 2 and is provided exteriorly of the latter with a ratchet 22 the teeth of which are adapted to be engaged by a pawl 24 pivoted to the outer end of an arm 26 mounted for oscillatory movement upon the hub of said ratchet 22. A spring 28 tends to press said pawl into engagement with the teeth of the ratchet and the outer end of the arm 26 is pivotally connected to one end of a push rod 30 having its other end pivotally secured to the end of one of the arms 32 of a bell crank lever mounted for oscillatory movement upon a stud shaft 34 projecting outwardly from the side frame member 2. The other arm 36 of the bell crank lever is pivotally connected to one end of a link 38 having its other end pivotally secured to a crank pin 40 on a gear 42 fast in any suitable manner upon the end of a transverse shaft 44 journaled in bearings 46 extending downwardly from the two side frame members 2 and 4. Said gear 42 is in mesh with a gear 50 fast on a transverse shaft 52 mounted for rotary movement in bearings 54, 54 extending downwardly from the side frame members 2 and 4, and carrying upon its other end a fly or balance wheel 48. Rotation of the gear 50 may be effected by a handle 56, secured to the outer face of said balance wheel 48 in any suitable manner.

Upon the shaft 52 adjacent the fly wheel 48 there is provided a ratchet 57 adapted to be engaged by a locking pawl 59 pivoted to the outer side of the lateral frame member 4, said pawl and ratchet preventing reverse rotation of the shaft 52 except when desired. When such reverse rotation is desired or necessary the pawl can be thrown backward about its pivot so as to remain out of engagement with said ratchet.

From the construction so far described, it will be apparent that rotation of the gear 50 will, through the gear 42, crank pin 40, link 38 and bell crank lever 32, 36, communicate reciprocatory movement to the rod 30 and cause the pawl 24 to oscillate about the shaft 20, the latter pawl engaging the teeth of the ratchet 22 in its forward movement and passing idly over said teeth in its reverse movement, thus communicating intermittent rotary movement to said ratchet, shaft 20 and pinion 18, and through the latter and the rack 16, a step-by-step forward movement to the carriage 12.

Herein means are provided for varying the effective length of the feeding stroke of the pawl 24, for causing the material to be fed a greater or less distance at each step, as will hereinafter be more fully described.

The cutter and its actuating mechanism will now be described. In the preferred form thereof herein illustrated and described for illustrative purposes, the cutter consists of a blade 58 having rigidly secured in any suitable manner to its lateral edges guide ears 60, 60 and 62, 62 slidingly embracing vertical guide rods 64, rigidly secured at their lower ends in brackets 66, 66 extending outwardly from the side frame members 2 and 4, said rods 64, 64 being joined at their upper ends by a transverse connecting member 68. To the two ears 60, 60 are pivotally connected at 70 one end of links 72, 72, pivotally connected at their lower ends to two arms 74, 74 rigidly mounted at their opposite ends upon a transverse shaft 76 mounted for oscillatory movement in bearings 78, 78 projecting downwardly from the two side members 2 and 4 of the frame. Intermediate its two ends there is rigidly secured to said shaft 76 a rearwardly extending arm 80 provided at its free end with a cam roll 82 adapted to travel in a cam groove 84 provided in the side face of a cam member 86 secured upon the shaft 44 in any suitable manner.

The cutting edge 90 of the knife or cutter 58 will preferably be toothed or scalloped, substantially as shown in Fig. 5, and said teeth would preferably be sharpened upon their forward sides, that is to say the side toward the piece of ice cream or other material to be severed from the main piece, to facilitate the penetration of the knife. At a point half way between its two lateral edges the knife 58 is provided with a smaller cutter or blade 92, preferably of triangular shape as shown in Fig. 7, said cutter 92 projecting at right angles to the blade 58 and making a cut joined to and directed at right angles to the cut made by the latter.

From the illustrative embodiment of the knife and the actuating mechanism above described, it will be apparent that rotation of the fly wheel 48 will, through the intermeshing gears 50 and 42 rotate the shaft 44 and cam member 86 secured thereto. The latter, through the cam groove and roll 82 traveling therein and mounted on one end of the arm 80, will rock said arm 80 and shaft 76 to which it is secured and also the arms 74 projecting from said shaft, the rods 72, 72 to which the free ends of the arms 74 are pivotally connected as already described, will thus be reciprocated vertically and with them the knife or cutter 58 which will be guided in its movement by the engagement of the guide ears 60 and 62 with the vertical guide rods 64. The downward or cutting movement of the blade 58 will be effected against the tension of the springs 88, 88 which contribute to raise the knife when permitted by the cam groove 84 when the downward or cutting stroke of the knife has been completed, said springs also tending to maintain the cam roll 82 in contact with the inner edge of said cam groove. The cam groove 84 will preferably be so shaped that the upward movement of the knife will be relatively more rapid than the downward or cutting movement thereof, but said upward movement will be effected without shock or jar by the controlling action of the outer edge of the cam groove 84 on the cam roll 82. This avoids the necessity of using buffers or other cushioning means to cushion the upward or return stroke of the knife, although helical springs could also be inserted to embrace the rod 64 between the guide ears 60 and the transverse brace 68 or a dashpot suitably placed could be used, if desired.

In cutting plastic materials, some of the material is liable to adhere to the knife, and if allowed to accumulate such adhering matter may, in the long run, impede the operation of the knife. In cutting ice cream, for example, the latter shows a tendency to adhere or congeal upon the blade and it has been found that the material which thus accumulates upon the knife, if the latter is used continuously for any length of time, impedes the action of the knife by, among other things, increasing the effort necessary to drive the knife through the frozen mass.

The present invention, accordingly, contemplates the provision of means to meet this difficulty. While any suitable means might be provided for this purpose, said means, in the illustrative embodiment of the invention herein shown and described, comprises means for removing from the cutting blade any of the material that is being operated upon which may adhere thereto. To this end, the machine in the embodiment of the invention shown, includes four rods 94, 96, 98 and 100, two upon each side of the machine, secured at their lower ends in the brackets 66 and at their upper ends in bosses 102 of the transverse brace 68 of the cutter frame, at either side of the rods 64, 64. Upon these rods are adjustably and removably secured by means of sleeves 104 and clamping screws 106, receptacles 108. These receptacles 108 are closed at the back, the sides and at the top and bottom, but are open at their front sides, as shown in Fig. 7, said open sides extending throughout the full width of the knife which moves up and down between them. Within these receptacles is placed any material 110 adapted to absorb and retain water or other liquid, such as sponges, sponge-rubber, etc., and this wet or damp material contacts with the blade on both sides thereof through the open front of said two receptacles and keeps said blade clean as it reciprocates between them, said receptacles being so adjusted that as the knife reciprocates, substantially every part thereof, throughout its height and width will come into contact with said cleansing means 110. It will be noted that while the upper and lower edges of the knife penetrate between the two portions of said cleansing means 110 toward the end of the downward and upward stroke, respectively, there is always a sufficient portion of the knife between said two portions of cleansing means 110 upon opposite sides thereof, to prevent said two portions of cleansing means 110 from closing over either edge sufficiently to be objectionable in any way. The lower wall 112 of the right hand receptacle 108, Fig. 7, is provided with a slot 114 through which the smaller knife 92 passes upwardly and downwardly with the blade 58 and said right hand receptacle 108, Fig. 7, is preferably divided by a vertical partition 115, as shown in Fig. 8, extending from the rear wall 116 of said receptacle at right angles to said wall in the plane in which said knife 92 reciprocates. This partition 115 keeps the cleansing material 110 upon each side thereof sufficiently separate to provide a passage for said knife 92 in its reciprocating movement, while at the same time allowing said cleansing material to contact with both sides of said knife 92 sufficiently to keep said knife substantially free from any of the material being operated upon that may adhere thereto.

The invention contemplates the provision of means to prevent the ice cream or other plastic material being cut from being drawn upwardly with the knife in the latter's upward movement, and herein said means may conveniently be constituted by the lower surfaces of the receptacles 108. Said receptacles will be adjusted by the aid of the clamping screws 106, at such a height as just to leave sufficient clearance for the passage of the block of ice cream or other material thereunder.

As hereinbefore stated, the present invention contemplates the provision of means for varying or adjusting the effective length of the feeding stroke of the pawl 24, and thus to cause the material to be fed a greater or less distance at each step of the step-by-step feed according to the size which it is desired that the pieces or bricks shall have into which the slab or block of material is to be divided. Herein said adjusting means comprises a shield 124 provided with a hub 126 mounted for rotary movement upon the sleeve bearing 128 of the shaft 20 mounted and adapted to be secured in any angular position upon said bearing by a clamping screw 129 passing through said hub 126 clampingly to engage said sleeve bearing. By turning said shield about the shaft 20, the upper end thereof, Figs. 1 and 3, can be projected more or less between the pawl 24 and the teeth of the ratchet 22. It will be apparent that if said shield 124 is so adjusted as not to project between said pawl and the teeth of the coöperating ratchet, said pawl will be effective during its full stroke and will therefore turn the ratchet wheel 22 and feed the material the greatest possible distance at each step of the step-by-step feed. By adjusting the shield, however, as above described, to cause its upper end portion to project between said pawl and the teeth of the ratchet so as to cover one or more of the teeth of said ratchet, said pawl 24 will be kept out of contact with the teeth so covered and its effective feeding stroke will be correspondingly diminished and the distance through which the material is fed at each step of the step-by-step feed, while said adjustment remains in force, will be correspondingly shortened. It will thus be seen that the invention includes means for causing the material to be fed any desired distance at each step according to the thickness desired for the individual pieces or bricks into which the slab or block of ice cream is to be divided.

It is preferred not to place the material to be cut directly upon the carriage 12, but to provide separate means, herein a cutting block, preferably of wood, to sustain the material to be cut during the cutting operation. Said cutting block 118 may be of any suitable or appropriate dimensions. It is provided upon its under side with dowel pins 120, 120 adapted to enter holes 122, 122 provided in the carriage 12.

It is advantageous to provide against accidental displacement of the material upon the cutting block, particularly during the cutting operation. This is particularly desirable in the case of ice cream or other frozen materials which might be easily displaced upon said block, and the present invention accordingly contemplates the provision of simple and effective means to prevent such accidental displacement or slipping. In the present embodiment of the invention, such means may conveniently comprise any suitable means provided upon the upper surface of the cutting block. As one possible means of carrying out this feature of the invention, the upper surface of the cutting block is herein preferably provided with transverse grooves or slits 136 and a longitudinal slot or slit 138. These slots or slits by their engagement with the under surface of the material being operated upon prevent accidental or inadvertent displacement thereof both transversely or longitudinally of the cutting block.

The transverse slots or slits 136 may conveniently be spaced to correspond to the length of feed stroke used, so that the cutting edge of the knife 58 will enter said transverse slots in completing its cutting movement, the cutting edge of the knife 92 entering the longitudinal slot or slit 138 in the same manner. Different cutting blocks having differently spaced transverse slots 136 corresponding to the different feed strokes used may be provided.

It is also found advantageous to provide for sustaining or steadying the rear end of the block of material being operated upon, so that the last brick to be severed may be steadied while being severed and may be severed with a clean cut. In the embodiment of the invention herein shown, such means are conveniently constituted by an abutment in the form of two plates 140 which may conveniently be inserted in one of the transverse grooves or slits 136 at either side of the longitudinal groove 138, so as to leave clearance between said plates for the operation of the small knife 92.

In practice, the slab or block of ice cream to be cut into smaller pieces or bricks is turned from the mold in which it was frozen directly onto the upper surface of the cutter block 118 with its rear end abutting against the two plates 140, 140. In cutting ice cream or other frozen material, it is preferable to allow the block of ice cream to remain in position on the cutting block a short time before proceeding with the cutting operation, as this enables the ice cream upon the lower surface of the block of ice cream to penetrate the transverse slots 136 and longitudinal slot 138, when the block of ice cream will be securely held against displacement or slipping on the cutting block. The cutting block with the slab or block of ice cream, or other material to be cut, the rear end of said slab abutting against the plates 140, 140, is then placed on the carriage 12 with the dowel pins 120, 120 in engagement with the holes 122, 122 of said carriage. The knife being in its raised position and the pawl 24 in its retracted position and held out of engagement with the teeth of the ratchet 22 by the upper end, Fig. 3, of the shield 124, the carriage 12, with the cutting block 118 and cake of ice cream 132 thereon is then slid back or to the right, Fig. 1, by hand until the forward or left end surface, Fig. 1, of the cake of ice cream 130 coincides with an index 142 (Fig. 2) so placed that said end surface of the cake is then just in front of the vertical plane in which the knife travels in its cutting movement. If desired, an adjustable stop 134 may also be provided, which will assure that the front or left end surface, Fig. 1, of the ice cream cake shall be in this position, when the right end of the cutting block is in contact with said stop. The operator now seizes the handle 48 and turns the shaft 52 to the right, or contraclockwise as indicated by the arrow at the right of the gear 50 in Fig. 1. The crank pin 40 and cam 86 are so timed relatively that the cam 86, through the mechanism already described, moves the knives downwardly, and the smaller knife 92 makes its longitudinal cut in the cake of ice cream, from the end surface inwardly, while the main knife 58 passes down in front of the front end-surface of said cake. Rotation of the shaft 52 continuing, the knife 58 rises rapidly and when the knife is clear of the cake of ice cream the pawl 24 will be advanced and will execute its feeding stroke, thus feeding the material a step in advance, of the desired length and for which the shield 124 has been adjusted. The feeding movement having been completed, the knives again descend, the knife 58 making the first transverse cut, said cut, in conjunction with the longitudinal cut previously made by the knife 92 severing two bricks from the main block of ice cream, and the knife 92 making its second longitudinal cut. The knives rise again, another feed movement takes place, the knives descend and two more bricks are severed. This cycle of operation is repeated so long as the shaft 52 is rotated by the operator or until the whole cake of ice cream has been divided into bricks as desired. In their reciprocating movement, the blades 58 and 92 are cleansed or freed from any material that may adhere thereto, by means of the sponges 110, as previously described. Engagement of the pinion 18 with the rack 16 will be sufficient to prevent any reverse movement of the ratchet 22 by the pawl 24 as the latter slides idly over the teeth of said ratchet in the reverse movement of said pawl.

In the modified construction of the feeding mechanism shown in Fig. 9, the shaft 20, ratchet 22, pinion 18 and rack 16 are omitted, the pawl 24 engaging a rack 144 secured to the side of the cutting block. A plurality of cutting blocks, each having a rack 144 with rack teeth of different length will preferably be provided, the length of tooth in each case corresponding to the thickness of the bricks into which the slab is to be cut, the teeth always beginning with one transverse slot 136 of the cutter block and ending with the next following transverse slot 136 thereof. The right end of the push rod 30 in the construction shown in Fig. 9 will preferably be adjustably secured in a slot 145 in the upper end of the link 38 to enable the feed stroke of said rod to be adjusted to correspond to the length of tooth of the rack of whichever block is used.

In practice, the cakes of ice cream are all usually of the same length, width and thickness, the common length usually being 26 inches. These cakes are usually cut into bricks of such a thickness that there shall be six bricks to the quart, seven bricks to the quart or eight bricks to the quart. Where it is desired to have six bricks to the quart, the cakes are cut into fifty-two bricks, where seven to the quart are desired, the cake is cut into sixty-two bricks, and where eight to the quart are desired the cake is cut into seventy bricks. Since as already explained, two bricks extending in the same transverse plane are cut at each stroke of the knife, the result is that when a cake is cut into six bricks to the quart each brick will be 1 inch in thickness, where the cake is cut into seven bricks to the quart each brick will be approximately $\frac{8}{10}$ of an inch, and where the cake is cut into eight bricks to the quart the thickness of each brick will be approximately $\frac{7}{10}$ of an inch. It is usual, therefore, to provide cutting blocks having the transverse slots 136 approximately 1 inch, $\frac{8}{10}$ of an inch, and $\frac{7}{10}$ of an inch apart, the racks of each block having their teeth of the same length as the spacing of the transverse slots 136. It will thus be seen that if the cutting block is always placed with the first transverse slot 136 coinciding with the end of the cake and with the path of the knife, the stroke of the push rod can be adjusted once for all for a feed stroke of a little over 1 inch, and the push rod will then feed correctly any one of the three blocks referred to since in the case of the two blocks having rack teeth of less than an inch the pawl will at each rearward stroke be drawn back slightly beyond the end of the tooth, but as it is always moved forward the same distance it will always feed the block the required distance, there being merely a slight lost motion at the beginning of the feed stroke. This adjustment for a feed stroke of a little over 1 inch would in fact answer for any feed stroke of an inch or less as will be readily understood.

In this modified construction, when it is desired to return the carriage to its initial position after the cutting of a cake has been completed, the pawl 24 will be removed from engagement with the rack on the cutting block by raising the push rod 30 and placing it upon the rest 146.

In this construction also preferably a spring pressed locking pawl will be provided to engage a vertical rack 148 on the side of the cutting block to prevent rearward movement thereof during the cutting operation. A cam 150 may be provided to hold this pawl out of engagement with the vertical rack 148 when the cutting block is to be moved backwardly.

The knife 92 will have its lower cutting edge of sufficient length to correspond to the longest feed movement that the machine is capable of executing, so that it will be adapted to sever blocks of any desired thickness. It will be apparent that where it is not desired transversely to divide the bricks cut off by the main blade 58, said blade 92 may be omitted.

It will be apparent that it is not indispensable that all of the features of the invention be used conjointly, since they may be used to advantage separately in various combinations and sub-combinations. It will also be understood that while the invention is herein described as embodied in the details illustrated, the invention is not to be considered as circumscribed by or limited to these details, or any of them, but that said details may be variously modified within the true scope of the invention which is definitely set forth by the claims.

Claims—

1. In a machine for cutting or slicing ice cream, in combination a vertical reciprocating cutter comprising a knife edged cutter blade extending transversely of the machine and at right angles to the direction of feed of the material to be cut and a second knife edged cutter blade extending longitudinally of the direction of feed, said first-named cutter blade having its cutting edge serrated or toothed, the serrations thereof extending into said blade in a direction substantially parallel with the plane of said blade; a feed carriage for the material to be cut; actuating mechanism to feed said carriage step by step past the cutter; and actuating mechanism for the cutter to reciprocate the latter between successive feed movements of said carriage.

2. In a cutting or slicing machine, in combination, a reciprocatory cutter, comprising a blade extending transversely of the machine at right angles to the line of feed of the material to be cut and a second blade projecting from the rear face of said first-named blade and at right angles thereto in the direction from which the material to be cut is fed to said cutter; actuating mechanism for said cutter to reciprocate the latter rectilinearly; a feed carriage for the material to be cut; and actuating mechanism to feed said carriage step by step past said cutter.

3. In a machine for slicing or cutting ice-cream, in combination, a cutter comprising a cutter-blade extending transversely of the block of ice-cream to be cut and at right angles to the longitudinal axis of said block and a second blade projecting from the rear face of said first-named blade and at right angles thereto in the direction from which said block of ice-cream is fed to said cutter; actuating mechanism to reciprocate said cutter; a feed carriage to feed the block of ice-cream past the cutter; actuating mechanism for said feed carriage to feed the latter past said cutter between successive reciprocations of said cutter; and cutter-blade cleaning means comprising liquid absorbent material for cleaning said cutter-blades between successive reciprocations of the cutter.

4. In a machine for dividing a block of ice-cream into a plurality of pieces of equal size, in combination, a feed-carriage; a cutter block extending substantially the length of said feed carriage and upon which the block of ice-cream to be cut is placed, said cutter block having cutter-receiving grooves in the face thereof; means removably to secure said cutter-block upon said feed-carriage; a cutter comprising a blade extending transversely of the block of ice-cream and at right angles to its longitudinal axis and a second blade projecting centrally from the rear face of said first-named blade and at right angles to the latter in the opposite direction to the feed movement of the feed-carriage; and actuating mechanism to feed said feed-carriage with the block of ice-cream step by step past the cutter and to reciprocate said cutter once between each step by step feed movement of said feed carriage, thus causing said cutter at one reciprocation to make a longitudinal median cut in said block of ice-cream and on the next reciprocation to cut said block transversely and sever therefrom two pieces of equal size.

In testimony whereof I have signed my name to this specification, in the presence of two subscribing witnesses.

FREDERICK X. KUHN.

Witnesses:
  ROBERT H. KAMMLER,
  BERTHE DAVID.